United States Patent Office 3,516,978
Patented June 23, 1970

3,516,978
POLYMERIZATION OF OLEFINIC COMPOUNDS AND CATALYSTS THEREFOR
Edward H. Mottus, 350 Claymont Drive, Ballwin, Mo. 63011, and Morris R. Ort, 1018 Edgeworth, Kirkwood, Mo. 63122
No Drawing. Filed Mar. 6, 1967, Ser. No. 620,670
Int. Cl. C08f 1/28, 3/06
U.S. Cl. 260—94.9                    16 Claims

ABSTRACT OF THE DISCLOSURE

A chemical method is described for making olefin, e.g., ethylene, polymerization catalysts. In this method, an alloy of a non-transition metal, e.g., aluminum, and a transition metal, e.g., manganese or vanadium, is reacted with a methylene dihalide, e.g., $CH_2Cl_2$, using as an initiator a small amount of, e.g., an aluminum and methylene dibromide reaction product, excluding moisture from the reaction. The catalyst activity can be promoted by water and other electron donor compounds.

---

The invention relates to the polymerization of ethylenic compounds, polymerization catalysts and a chemical method for making the catalysts.

In a copending application of even date is described an electrolytic method for making separately the non-transition metal component of the catalysts of the present invention; in another copending application of even date is described an electrolytic method for making catalysts similar to those of the present invention and in a third application of even date is described a chemical method for making separately a non-transition metal component of the catalysts of the present invention. The catalysts of the present invention are broadly covered by the claims of the first-mentioned copending application above.

A number of patents and a publication exist teaching reactions of metal alloys of transition and non-transition metal alloys with organic halides to form catalysts which will polymerize olefinic compounds such as ethylene. In general, these catalysts are insoluble suspensions in a liquid medium, and they leave in the polymer products catalyst residues which are difficult and expensive to remove. Typical of these patents are the following: U.S. 2,905,646; British 832,929; British 836,642; British 854,385; British 886,182 and Japanese 5958 (1960). Other related prior art is the following: Patents—British 831,145; French 1,129,678; French Addition 68,982; French 1,300,864; Japanese 6736 (1962); Japanese 14,038 (1961); Japanese 1889 (1962); British 805,142; French 1,155,962; British 860,046; U.S. 3,065,216; German 1,121,813; French 1,138,290 and French 1,137,459; Publication— Dubose, J. P., Coste, J. and Thiebaut R., Bull Soc. Chem. France, (1961), 478–86.

In the process of the present invention, alloys of transition metals and non-transition metals are reacted with a methylene dihalide. An initiator which can be a small amount of an aluminum and methylene dibromide reaction product can be used to start the reaction and moisture should be excluded from the reaction. It is also preferred to exclude oxygen by inert gas blanketing. These catalysts of the invention in general are more soluble than the Ziegler catalysts which are usually used as suspensions rather than solutions for polymerization, and at least the chlorides will usually be soluble in the methylene dichloride in which they are made in sufficient concentrations for polymerization, although obviously they can be used as suspensions as are the Ziegler catalysts.

These catalysts can be promoted by water or other electron donor compounds.

Transition metals suitable for use in alloys in the process of the invention are Groups III–B, IV–B, V–B, VI–B, VII–B, VIII and I–B metals, i.e., Sc, Y, La, Ce, Pr, Nd, Pm, Sm, En, Gd, Tb, Dy, Ho, Er, Tm, Yb, Lu, Ac, Th, Pa, U, Np, Pu, Am, Cm, Bk, Cf, Es, Fm, Md, No, Lw, Ti, Zr, Hf, V, Nb, Ta, Cr, Mo, W, Mn, Tc, Re, Fe, Ru, Os, Co, Ph, Ir, Ni, Pd, Pt, Cu, Ag and Au.

Non-transition metals for use in the invention are metals of Group II, III–A and boron, and IV–A, i.e., Be, Mg, Ca, Sr, Ba, Ra, Zn, Cd, Hg, B, Al, Ga, In, Tl, Si, Ge, Sn and Pb.

The molar ratio of non-transition metal to transition metal may vary from 0.1:1 to 10:1 on up to 1000:1 or higher, with preferred ratios being 0.3:1 to 200:1. The preferred ratio in each case will depend on the particular metals involved in each alloy and the ability of the particular catalyst involving these metals to polymerize olefinic compound. For example, in catalysts made from Al/V alloys, the amount of V in the alloy may be of the order of 2.5% or less since these are extremely active polymerization catalysts; whereas, with catalysts made from Al/Ti alloys, usually it is preferred to have the percent Ti in the alloy well above 5%. In addition to the particular alloys used in the examples described below, alloys exemplified hereinabove in the first list of prior art patents, i.e., the U.S., four British and one Japanese patent, can be used in the process of the present invention to make active polymerization catalysts. Also, more than one transition metal and/or non-transition metal can be used in the alloys.

The methylene dihalide reactant $CH_2X_2$ can be methylene dichloride, methylene diiodide, methylene dibromide or methylene difluoride, but the preferred methylene dihalides are the chlorides and iodide. Also, mixtures of methylene dihalides or mixed methylene dihalides such as $CH_2ClI$ can be used. It is also possible that a gem dihalide, such as described in the first-mentioned copending application, which does not readily dehydrohalogenate or alkylate can be used instead of the methylene dihalide. Also, the methylene dihalide can be used in excess of that required for the electrolysis as a solvent for the catalysts made or an inert solvent such as hexane, benzene or the like can be used.

As an initiator for the reaction a small amount sufficient to initiate the reaction of a reaction product such as described in Example 1 can be used, some non-transition metal bromide, some of the catalyst solution from a previous run, or alternatively high temperatures and pressure can be used without initiator. With an initiator, it is usually convenient to carry out the reaction at reflux temperature for the methylene dihalide used, however, higher or lower temperatures can be used. Normally, the reaction will be run until all or substantially all the alloy is reacted and the time required will vary with the reaction temperature and the particular reactants involved. Normally, substantially all water should be excluded from all materials in the making of the catalysts by using drying agents, molecular sieve columns and dry inert gas blanketing.

The structure of the non-transition metal compound made in the process of the present invention is the same as the structure for the same metal in the copending application referred to hereinabove wherein the non-transition metal component is made separately electrolytically, but the structure of the transition metal compounds made by the present invention process is not known. Thus, if Al is the non-transition metal and $CH_2Cl_2$ is the methylene dihalide, the product is $Cl_2AlCH_2AlCl_2$ in the process of the present invention.

As in the case of the catalysts of the copending application mentioned above wherein the non-transition metal component was made separately electrolytically, minor amounts of third components to modify or promote polymerization catalyst activity can be used with the catalysts of the present invention, i.e., water or other electron donor compound. Normally, optimum amounts of water to use with the catalyst will be in the range of about 0.5 to 2 moles per mole of the non-transition component of catalyst, although more or less can be used.

In general, the catalysts of the present invention can be used to polymerize the same olefinic compounds and, under similar conditions of solvents, temperature, pressure, time, amounts of catalysts and the like as the catalysts of the above-named copending application wherein the non-transition metal component is being made separately electrolytically, and the polymer products can be recovered in a similar manner as the copending application.

The catalysts of the present invention have extremely high catalyst activity giving very high yields of polymer product per gram of catalyst, and also these catalysts have a high degree of solubility normally being soluble in the methylene dihalide in which they are made in a sufficient concentration for use as polymerization catalysts. As a result, small amounts of catalyst can be used and most of the catalyst is removed from the polymer in the liquid polymerization solvent when the solvent is separated from the polymer product. As a practical matter, the catalyst residues in the polymer products are usually insignificant and no further treatment of the polymer product to remove catalyst residues is usually necessary. For conventional catalysts, such as the Ziegler catalysts, treatment of their polymer products to remove catalyst residues is an expensive and necessary operation. The invention will be more clearly understood from the following detailed description of specific examples thereof.

EXAMPLE I

This example describes the preparation of an aluminum/vanadium co-catalyst and the polymerization of ethylene using this catalyst. First is prepared an initiator for the making of the co-catalyst. This initiator is prepared as follows: To a flask equipped with a stirring apparatus, reflux condenser and suitable equipment for inert atmosphere maintenance is charged about 1.5 g. of aluminum, 50 ml. of dibromomethane and a crystal of iodine. Precautions are taken to carefully dry all reactants using drying agents and molecular sieve columns, and also dry nitrogen or other blanketing is used to exclude moisture. The mixture is heated and usually as the dibromomethane just starts to reflux the iodine color disappears and an exothermic reaction sets in. The heating mantle is turned off and the reaction mixture refluxes from the heat of reaction until reaction is complete. The reaction mixture is cooled and used as for the second step. The reaction mixture is a slurry of solids with somewhat different appearance depending on the grade of aluminum used.

The aluminum/vanadium co-catalyst is prepared as follows: 0.5559 g. of 97.5% aluminum and 2.5% vanadium alloy was charged to a similar reaction vessel as described in the previous paragraph, 100 ml. of dichloromethane was added to the reaction vessel and then 3 ml. of the methylene dibromide/aluminum reaction mixture described in the previous paragraph. Again, careful drying of all reactants and the nitrogen blanketing is done for maximum yields of the desired soluble catalyst. The reaction is carried out under nitrogen-blanketing. The aluminum/vanadium alloy was charged to the reaction vessel in the form of about 1/8" cubes. A magnetic stirring bar was used to agitate the reaction mixture, the mixture was refluxed for several days, after which time all of the alloy had reacted to give a slurry of both gray metallic solids and light tan solids. The reaction mixture was allowed to settle, giving a precipitate and a clear homogeneous liquid. The clear homogeneous liquid contains the desired soluble aluminum/vanadium co-catalyst.

To a polymerization vessel was charged 20 ml. of the clear homogeneous liquid catalyst prepared as described in the previous paragraph and one liter of hexane. It is desirable to add a sufficient amount of water or other electron donating compound to promote the activity of the catalyst and this may be of the order of about an equimolar amount based on the vanadium present. The reactor was pressured to 70 p.s.i.g. with ethylene and the stirrer was turned on. Ethylene uptake was immediate and exothermic. Cooling water was turned on immediately and the run was terminated after 10 minutes. The reactor was opened after cooling and the solid mass of polyethylene product was physically removed from the reactor and placed in methanol. The polyethylene was broken up in a Waring blender with methanol as a vehicle. The polyethylene was isolated by filtering under vacuum and washing on the filter with additional methanol. Then the polymer was sucked dry under vacuum, was treated with 25 ml. of IONOL in methanol (1 milligram of IONOL per ml. of solution—IONOL is 2,6-di-tert-butyl-4-methylphenol) and the polymer was dried overnight in a vacuum oven. Yield was 39.2 g. of solid polyethylene.

EXAMPLE II

This example describes the preparation of an aluminum/manganese co-catalyst and polymerization of ethylene using this catalyst. The preparation of the co-catalyst was carried out in a similar manner and in similar equipment to that described for the preparation of the aluminum/vanadium co-catalyst of Example I. 1.3811 g. of aluminum/manganese alloy analyzed as containing 95% aluminum and 4.5 manganese, 150 ml. of dichloromethane and 3.0 ml. of methylene dibromide/aluminum reaction mixture prepared as described in Example I was charged to the reaction vessel. Again, all reactants and blanketing medium are carefully dried. The alloy was cut in about 1/8" cubes. The magnetic stirrer was turned on and the reaction mixture was heated to reflux using nitrogen-blanketing. After three days of refluxing, all of the alloy had reacted. The product was a slurry of light yellow solids in an amber liquid. The solids were allowed to settle out and were separated from the desired clear liquid containing the soluble co-catalyst.

To the polymerization vessel was charged 15 ml. of the soluble liquid co-catalyst prepared as described in the previous paragraph and one liter of hexane. Similarly, to the catalyst of Example I, a small amount of water or other electron donor compound is preferably added to the catalyst to promote activity. The reactor was then pressured successively with ethylene to 42 p.s.i.g., hydrogen to 57 p.s.i.g. and ethylene to 76 p.s.i.g. The ethylene feed was left on and the stirrer was turned on in the reactor. The polymerization was run for one hour after which time the reactor was vented and opened. The reaction mixture was quenched with methanol, filtered, the polyethylene washed on the filter with methanol and dried overnight in a vacuum oven. Yield of solid polyethylene 10.6 g.

Although the invention has been described in terms of specified embodiments which are set forth in considerable detail, it should be understood that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A process for making olefin polymerization catalysts comprising heating at a temperature sufficient to initiate reaction an alloy of a non-transition Group III–A metal and a transition metal selected from the group consisting of Groups and VII-B, the mole ratio of said non-transition metal to said transition metal being from about 0.3:1 to about 200:1, with a methylene dihalide of the formula $CH_2X_2$ where X is a halogen atom substantially in the absence of moisture.

2. A process of claim 1 wherein a reaction product of a non-transition metal selected from Group III-A metals and methylene dibromide is used to initiate the process.

3. A process of claim 1 wherein X is a chlorine atom.

4. A process of claim 1 wherein the alloy is an aluminum and vanadium alloy, X is a chlorine atom and a sufficient amount of a reaction product of aluminum and methylene dibromide is used to initiate the process.

5. A process of claim 1 wherein the alloy is an aluminum and manganese alloy, X is a chlorine atom and a sufficient amount of a reaction product of aluminum and methylene dibromide is used to initiate the process.

6. A catalyst made by the process of claim 1.

7. A catalyst made by the process of claim 3.

8. A catalyst made by the process of claim 4.

9. A catalyst made by the process of claim 5.

10. A polymerization process comprising polymerizing ethylene in the presence of the catalyst made by the process of claim 1.

11. A process of claim 10 wherein X is a chlorine atom.

12. A process of claim 10 wherein a sufficient amount of water as an electron donor compound is present to modify catalyst activity.

13. A process of claim 12 carried out in the presence of a sufficient amount of hydrogen to modify the polymer properties.

14. A polymerization process comprising polymerizing ethylene in the presence of the catalyst made by the process of claim 3, said polymerization process being carried out in the presence of a sufficient amount of hydrogen to modify the polymer properties.

15. A polymerization process comprising polymerizing ethylene in the presence of the catalyst made by the process of claim 4, said polymerization process being carried out in the presence of a sufficient amount of hydrogen to modify the polymer properties.

16. A polymerization process comprising polymerizing ethylene in the presence of the catalyst made by the process of claim 5, said polymerization process being carried out in the presence of a sufficient amount of hydrogen to modify the polymer properties.

References Cited

UNITED STATES PATENTS

| | | | |
|---|---|---|---|
| 2,905,646 | 9/1959 | Natta et al. | 252—431 |
| 2,938,020 | 5/1960 | Matlack | 260—94.9 |
| 2,984,658 | 5/1961 | Seydel et al. | 260—94.9 |
| 3,051,690 | 8/1962 | Vandenberg | 260—88.2 |
| 3,109,838 | 11/1963 | Chatt et al. | 260—93.7 |
| 3,247,173 | 4/1966 | Shearer et al. | 260—88.2 |

FOREIGN PATENTS

| | | |
|---|---|---|
| 833,929 | 4/1960 | Great Britain. |
| 836,642 | 6/1960 | Great Britain. |

JOSEPH L. SCHOFER, Primary Examiner

E. J. SMITH, Assistant Examiner

U.S. Cl. X.R.

252—429, 431

UNITED STATES PATENT OFFICE
CERTIFICATE OF CORRECTION

Patent No. 3,516,978      Dated June 23, 1970

Inventor(s) Edward H. Mottus and Morris R. Ort

It is certified that error appears in the above-identified patent and that said Letters Patent are hereby corrected as shown below:

In the heading to the printed specification, line 6, after the numeral "63122", insert a comma and the following phrase --- assignors to Monsanto Company, St. Louis, Mo., a corporation of Delaware ---.

Column 1, line 50, for the number "5958" read --- 5989 ---.

Column 4, line 36, for "4.5 manganese" read --- 4.5% manganese ---.

Column 5, line 1, after the word "Groups" insert --- V-B ---.

SIGNED AND SEALED

OCT 27 1970

(SEAL)
Attest:

Edward M. Fletcher, Jr.
Attesting Officer

WILLIAM E. SCHUYLER, JR.
Commissioner of Patents